United States Patent [19]

Massa

[11] Patent Number: 5,574,947
[45] Date of Patent: Nov. 12, 1996

[54] DATA COMMUNICATION CABLE FOR A DATA TERMINAL FOR SIMULTANEOUSLY CONNECTING MULTIPLE PERIPHERAL DEVICES AND SELECTING THE PERIPHERAL DEVICES BASED ON DATA RATE

[75] Inventor: Blaise A. Massa, Clifton, N.J.

[73] Assignee: United Parcel Service of America, Inc., Atlanta, Ga.

[21] Appl. No.: 246,055

[22] Filed: May 17, 1994

[51] Int. Cl.[6] .................................................. H04L 23/00
[52] U.S. Cl. ......................... 395/829; 395/287; 395/823; 370/85.1; 364/222.2; 364/238.2; 364/239; 364/259.4; 364/919; 364/940.81; 340/825.52
[58] Field of Search ..................................... 307/112, 139; 340/825; 364/464, 466; 379/422

[56] References Cited

U.S. PATENT DOCUMENTS

| | | | |
|---|---|---|---|
| 4,508,399 | 4/1985 | Dowling et al. | 339/17 CF |
| 4,574,352 | 3/1986 | Coppola et al. | 364/466 |
| 4,607,379 | 8/1986 | Marshall, Jr. et al. | 375/121 |
| 4,686,506 | 8/1987 | Farago | 340/347 |
| 4,725,698 | 2/1988 | Takai et al. | 200/50 |
| 4,794,520 | 12/1988 | Kobus, Jr. et al. | 395/287 |
| 4,872,004 | 10/1989 | Bahnick et al. | 340/825.500 |
| 4,941,845 | 7/1990 | Eppley et al. | 439/505 |
| 4,988,890 | 1/1991 | Narhi et al. | 357/147 |
| 5,258,655 | 11/1993 | May et al. | 307/139 |
| 5,276,443 | 1/1994 | Gates et al. | 340/825.06 |
| 5,293,013 | 3/1994 | Takahashi | 200/51 |
| 5,335,313 | 8/1994 | Douglas | 395/2.84 |
| 5,347,113 | 9/1994 | Reddersen et al. | 235/462 |
| 5,455,859 | 10/1995 | Gutzmer | 379/442 |

FOREIGN PATENT DOCUMENTS 62-256118  11/1987  Japan.

Primary Examiner—Thomas O. Lee
Assistant Examiner—Anderson J. Chen
Attorney, Agent, or Firm—Jones & Askew

[57] ABSTRACT

A splitter cable provides a means for simultaneously connecting a data terminal's communications port to a plurality of peripheral devices. The cable provides for the flow of data between the data terminal and the peripheral devices. A diode connected to each peripheral device's receive data line protects the device from electrical current associated with data being transmitted by the other peripheral devices. The connected peripheral devices each respond to unique data characteristics. The invention uses the data characteristics to control the transmission of data between the data terminal and the peripheral devices. Communication with the desired peripheral device is accomplished under program control without manual intervention by the user.

16 Claims, 2 Drawing Sheets

DATA COMMUNICATION CABLE FOR A DATA TERMINAL FOR SIMULTANEOUSLY CONNECTING MULTIPLE PERIPHERAL DEVICES AND SELECTING THE PERIPHERAL DEVICES BASED ON DATA RATE

TECHNICAL FIELD

The present invention relates generally to a data communications cable, and more particularly relates to a cable for simultaneously connecting multiple peripheral devices to a single communications port on a data terminal.

BACKGROUND OF THE INVENTION

Data terminals are used in conjunction with peripheral devices to perform a variety of functions related to sales, materials handling, and other activities. In many cases, the data terminal is a desk top or portable computer capable of processing data and communicating with peripheral devices. For example, in a grocery store environment, the data terminal may be a cash register and the peripheral devices may include a credit card magnetic stripe reader, a scale for weighing produce, and a printer for printing receipts. In a shipping or materials handling environment, the data terminal may be small device capable of storing package identifications numbers and related data, and the peripheral devices may include a scale for weighing packages and a printer for printing shipping labels.

Computing systems of this type may be useful in a variety of applications. However, many of these potential applications do not justify a large expenditure for each system. Therefore, in order to make such systems cost effective for a variety of potential applications, it is necessary to minimize the cost associated with each system.

Most of the computing devices used in such systems may be easily programmed to perform a variety of functions. Once a piece of software is written for a particular application, the software program may be easily duplicated for use in multiple terminals within a facility or organization. Therefore, the primary cost component for each additional system is associated with the cost of the hardware. One element that contributes to the hardware cost is the provision of multiple communications ports in order to allow the data terminal to communicate with a variety of peripheral devices. In many cases, it is not cost effective to provide a data terminal with a separate communications port for each peripheral device. Likewise, space constraints on small hand-held terminals may make it difficult to provide more than one serial port.

Although it is desirable to simultaneously connect a single communications port on a data terminal to multiple peripheral devices, a direct connection between a data terminal and multiple peripherals may result in malfunction or damage to the peripheral devices. For example, if data is transmitted from the data terminal to one of the peripheral devices, the data will also be received by the second peripheral device. This may cause the second peripheral device to operate at the wrong time, and to simultaneously attempt to send data to the data terminal. Another problem is that the data transmitted by one peripheral device to the data terminal will also be received by the output driver circuitry of the other peripheral device, which may result in damage to the output drivers. Therefore, provision must be made to ensure that each peripheral device responds only to the appropriate signals from the data terminal. Likewise each peripheral device must be protected from electrical signals sent by the other peripheral devices.

One available method of controlling signals between a data terminal and two peripheral devices is to include a switch box that provides a connector for each of the devices. Although the data terminal and peripheral devices are simultaneously connected to the switch box, internal wiring ensures that the data terminal is electrically connected to only one peripheral device at a time. An external switch is used to manipulate an internal connection, and to allow a user to manually determine which of the two peripheral devices will be electrically connected to the data terminal. Automatic switch boxes are also available for controlling communications between devices. However, these devices typically require external power, and are more expensive as a result of the additional circuitry required to automate the switching function.

Thus, there is a need in the art for an inexpensive way to simultaneously connect a data terminal to a plurality of peripheral devices, and to control transmission of signals without manual intervention.

SUMMARY OF THE INVENTION

The present invention satisfies the above described needs by providing an inexpensive splitter cable for simultaneously connecting a data terminal to two or more peripheral devices. The cable is constructed to facilitate communication between the data terminal and a selected peripheral device while remaining connected to the unselected devices, and to prevent interference by, or damage to, the unselected devices.

Generally described, in a preferred embodiment the present invention provides a cable for simultaneously connecting a data terminal to first and second peripheral devices. The data terminal is operative for sending data via transmit data signals and receiving data via first and second receive data signals. The transmit data signals have a first characteristic or a second characteristic. The first and second peripheral devices are operative for receiving transmit data signals from the data terminal, and for sending first and second receive data signals, respectively, to the data terminal. The first peripheral device is responsive to transmit data signals having the first characteristic. The second peripheral device is responsive to transmit data signals having the second characteristic. The preferred cable includes a blocking component for preventing the first receive data signals from being received by the second peripheral device and a blocking component for preventing the second receive data signals from being received by the first peripheral device.

Such a cable may be used in a system where the first characteristic is a first data rate and the second characteristic is a second data rate. Alternatively, the first characteristic may be a first data character and the second characteristic a second data character. In either case, the peripheral devices respond only to those transmit data signals that possess the appropriate characteristic.

More particularly described, the present invention provides a cable for simultaneously connecting a data terminal to first and second peripheral devices. The cable includes first and second connectors for connecting the cable to the respective peripheral device. The first and second connectors include first and second receive data conductors, respectively, for receiving output data from the attached peripheral device. The cable also includes a third connector for connecting the cable to the data terminal. The third connector includes a third receive data conductor for providing output data to the data terminal. A first blocking device is connected to the first receive data conductor for blocking current from the second peripheral device. Likewise, a second blocking device is connected to the second receive data conductor for blocking current from the first peripheral device. A receive data line connects the first and second data lines to the third receive data conductor.

In another aspect, the present invention provides a method for simultaneously connecting a data terminal to first and second peripherals devices, and for communicating with one of the peripheral devices while the other remains connected. The method includes providing transmit and receive data lines between the data terminal and the first and second peripheral devices, and transmitting transmit data signals from the data terminal to the first and second peripheral devices. The transmit data signals include a first or second characteristic. In response to the transmit data signals including the first characteristic, the first peripheral device transmits receive data signals to the data terminal. These signals are blocked from the second peripheral device. In response to the transmit data signals including the second characteristic, the second peripheral device transmits receive data signals to the data terminal. These signals are blocked from the first peripheral device.

As mentioned above, the method of the present invention may be used with a system in which the first characteristic is a first data rate and the second characteristic is a second data rate. Alternatively, the first characteristic may be a first data character and the second characteristic a second data character. In either case, the peripheral devices respond only to those transmit data signals that possess the appropriate characteristic.

Accordingly, it is an object of the present invention to provide a splitter cable that allows a data terminal to be simultaneously connected to multiple peripheral devices.

It is another object of the present invention to provide a splitter cable that allows a data terminal to communicate with one of a plurality of peripheral devices without requiring the disconnecting of the unselected peripheral device.

It is another object of the present invention to provide a splitter cable that allows a data terminal to communicate with either of two peripheral devices without requiring manual intervention on the part of the user.

It is another object of the present invention to provide a splitter cable that allows a data terminal to communicate with a first or second peripheral device by transmitting data having a corresponding data characteristic.

These and other objects, features, and advantages of the present invention may be more clearly understood and appreciated from a review of the following detailed description of the preferred embodiments and by reference to the appended drawings and claims.

DETAILED DESCRIPTION OF THE PREFERRED EMBODIMENT

Figure 1:
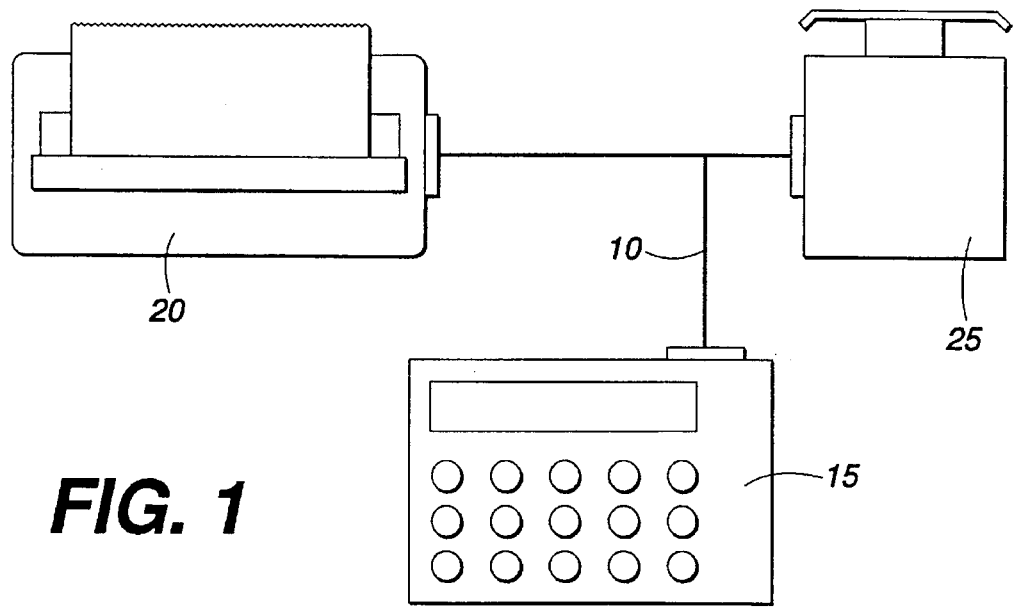
FIG. 1 is a diagrammatic representation of a system that incorporates the data communications cable of the present invention.

Referring now to the drawings, in which like numerals represent like elements throughout the several figures, FIG. 1 illustrates a data processing system employing a "Y" splitter cable 10 constructed in accordance with the present invention. The system shown is used in a shipping facility where packages are weighed and shipping labels are printed. In addition to the cable 10, the system includes a data terminal 15, a printer 20, and a scale 25. The data terminal 15 is used to capture information related to the shipment of each package, and is able to determine a shipping price based on the package's destination and weight (provided by scale 25). The printer 20 is used to print a shipping label that is affixed to the package.

While a specific system is shown by way of example, the cable 10 may be used in a variety of different systems including widely differing data terminals and peripheral devices. The data terminal 15 and the peripheral devices 20, 25 each have a communications port that allows data communications with other devices. The specific connections between the data terminal 15, printer 20, and scale 25 are discussed in more detail in conjunction with FIG. 2.

In the shipping facility system of FIG. 1, the data terminal 15 may be, for example, a Model 3300 data collector manufactured by Symbol Technologies, Inc., Bohemia, N.Y. The data terminal is a hand held computer that may include a keypad or other data input device, display, serial data communications port, microprocessor, and memory. The serial port may transmit or receive data having various parameters (e.g., baud rate, parity, stop bits, etc.). These parameters are controlled by the microprocessor, and thus may be easily changed under program control in a manner familiar to those skilled in the art. This allows the data terminal to be used to collect, store, and manipulate package and shipping data.

The printer 20 may be, for example, a model C Itoh CT41, manufactured by Itochu, Irvine, Calif. The printer may be capable of printing bar codes and text, and may be used for printing shipping labels. The preferred printer 20 includes a serial data communications port, and communicates at 9600 bits per second. The printer enters the bar code mode when it receives the appropriate escape sequence from the data terminal. Data received when the printer is in the bar code mode is printed as a bar code. The printer returns to the text mode upon receipt of another escape sequence. Data received by the printer when it is in the text mode is printed as ASCII characters on a label.

The scale 25 may be, for example, a model 7-1414, manufactured by Fairbanks, Middlebury, Vt. The scale is used to weigh packages and to provide weight data to the data terminal. This scale includes a serial data communications port, and communicates at 2400 bits per second. The scale is idle until it receives a control character from the data terminal. At that point, the scale transmits the weight to the data terminal. The scale returns to the idle state when the package is removed from the scale.

Figure 2:
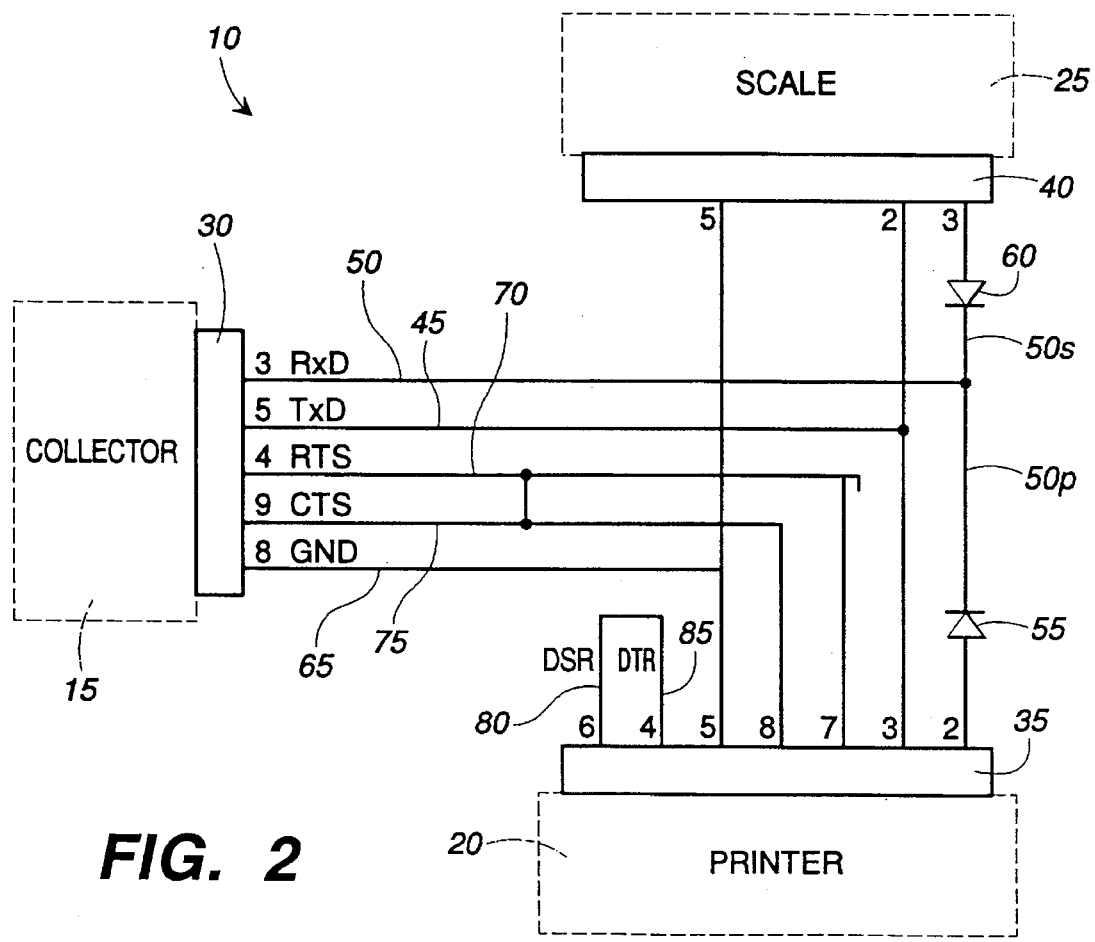
FIG. 2 is a schematic diagram illustrating the circuitry included in the data communications cable of FIG. 1.

FIG. 2 is a schematic diagram illustrating the circuitry embodied in the preferred Y splitter cable 10. Those skilled in the art will appreciate that the particular type of connectors used and the electrical connections provided within the cable 10 will be determined according to the requirements of the specific data terminal and peripheral devices that are to be connected.

Although the present invention is disclosed in the context of a shipping system using serial receive data transmitted on a single conductor, the invention can also be used with parallel data and other communications formats that use multiple conductors. In such systems, blocking devices such as diodes would be placed in all of the appropriate signal lines.

The preferred cable 10 includes three connectors. A data terminal connector 30 is a RJ-41 type connector, in which five of the eight available pins are used. A printer connector 35 is a female DB-9 type connector that is connected to a male connector on the printer 20. A scale connector 40 is a male DB-9 type connector that is connected to a female connector on the scale 25.

In the preferred system, the data terminal and peripheral devices communicate using signals that correspond to the EIA RS-232-C standard, which is published by the Electronic Industries Association, 2001 Eye Street, N.W., Washington, D.C, and is incorporated herein by reference and made a part hereof. As provided in section 2 of this standard, a voltage less than −3 volts corresponds to a binary 1. In addition to a data bit, a binary 1 indicates that a function is off. A voltage greater than +3 volts corresponds to a binary 0, which may be a data bit or an indication that a function is on. The range between −3 and +3 volts is defined as a transition range.

Serial data from the data terminal 15 to the printer 20 or scale 25 is provided on the transmit data line (TxD) 45. Transmit or output data signals are provided by the output driver circuitry (not shown) in the data terminal 15. These signals may include both control and data signals intended for the peripheral devices. In the preferred cable 10, the TxD line is connected to pin 5 of the data terminal connector 30, pin 3 of the printer connector 35, and pin 2 of the scale connector 40.

Serial data sent to the data terminal 15 from the printer 20 or scale 25 is provided on a receive data line (RxD) 50, which branches into a scale segment 50s and a printer segment 50p. Receive data signals are provided by the output driver circuitry (not shown) in the printer 20 and scale 25. These signals may include both control and data signals intended for the data terminal 15. In the preferred cable 10, the RxD line is connected to pin 3 of the data terminal connector 30, pin 2 of the printer connector 35, and pin 3 of the scale connector 40.

Current blocking devices are inserted in the RxD line segments 50p, 50s, respectively, in order to prevent unwanted current from flowing into the output drivers of the printer 20 and scale 25, respectively. In the preferred cable, the blocking devices are type 1N34A germanium diodes 55, 60. To prevent the unwanted flow of current into the output drivers, the anode of diode 55 is connected to the printer, and the anode of diode 60 is connected to the scale. When both the printer 20 and scale 25 are idle, the voltage at their respective RxD pins is approximately −8 volts, which results in no current flowing into the data terminal's RxD pin. However, when the printer 20 or scale 25 sends data to the data terminal 15, it provides an output voltage of approximately +8 volts. This results in current flowing from the active peripheral device and through its diode to the data terminal. However, the positive voltage produced by the active peripheral device causes the diode associated with the inactive peripheral device to be reverse biased. By making the cathode of the diode positive with respect to its anode, the diode is reverse biased, and no current flows from the active peripheral device into the output of the inactive peripheral device.

In the preferred configuration, the diodes are connected so that a high voltage signal from either of the peripheral devices is passed through to the data terminal. Therefore, the diodes are connected to form an OR gate, with the printer and scale as inputs and the data terminal as its output. Those skilled in the art will appreciate that in systems where it is necessary to provide a low voltage signal from the peripheral devices to the data terminal, the diodes may be connected to form an AND gate by reversing the anode and cathode of each diode. This would be appropriate where the peripheral device's idle state corresponds to a high voltage and the active state corresponds to the presence of low voltage signals. Likewise, those skilled in the art will understand that other blocking devices may be used. Such devices may include various filters, inductors, resistor-capacitor circuits, transistors, etc.

The other signal common to all three devices is the signal ground 65. The signal ground is connected to pin 8 of the data terminal conncetor 30, pin 5 of the printer connector 35, and pin 5 of the scale connector 40.

Those skilled in the art will understand that the preferred cable 10 is constructed to ensure that each device receives the handshaking signals necessary to indicate that the receiving devices are ready. In the case of the preferred scale 25, the need for external handshaking signals may be eliminated by properly configuring the scale. Likewise the preferred data terminal 15 may be programmed to operate with or without external handshaking signals.

In the case of the preferred printer 20, it is necessary to provide external handshaking signals during the transmission of data from the printer 20 to the data terminal 15. REQUEST TO SEND and CLEAR TO SEND signals are provided on RTS and CTS lines 70, 75, respectively. In the preferred cable 10, the RTS line is connected to pin 4 of the data terminal connector 30 and pin 7 of the printer connector 35. The CTS line is connected to pin 9 of the data terminal connector 30 and pin 8 of the printer connector 35. The RTS and CTS lines are shorted together so that the printer 20 will receive a binary 0 on the CTS line whenever it provides a binary 0 on the RTS line. This will be interpreted by the printer as an indication that the data terminal is ready and that the printer may send data to the data terminal on the RxD line.

The printer 20 also employs DATA SET READY and DATA TERMINAL READY signals, which are provided on the DSR and DTR lines 80, 85, respectively. The DSR and DTR signals are shorted together, and are provided on pins 6 and 4, respectively, of the printer connector 35. This ensures that the printer will receive the DSR signal whenever it asserts the DTR signal. Like the RTS signal, the printer interprets the presence of the DSR signal as an indication that it may send data.

By providing the above-described connections between the data terminal 15, printer 20 and scale 25, the cable 10 provides signal paths for communicating necessary data and control signals between the devices. Those skilled in the art will appreciate that the particular connections may vary according to the requirements of the devices used in the system.

Figure 3:
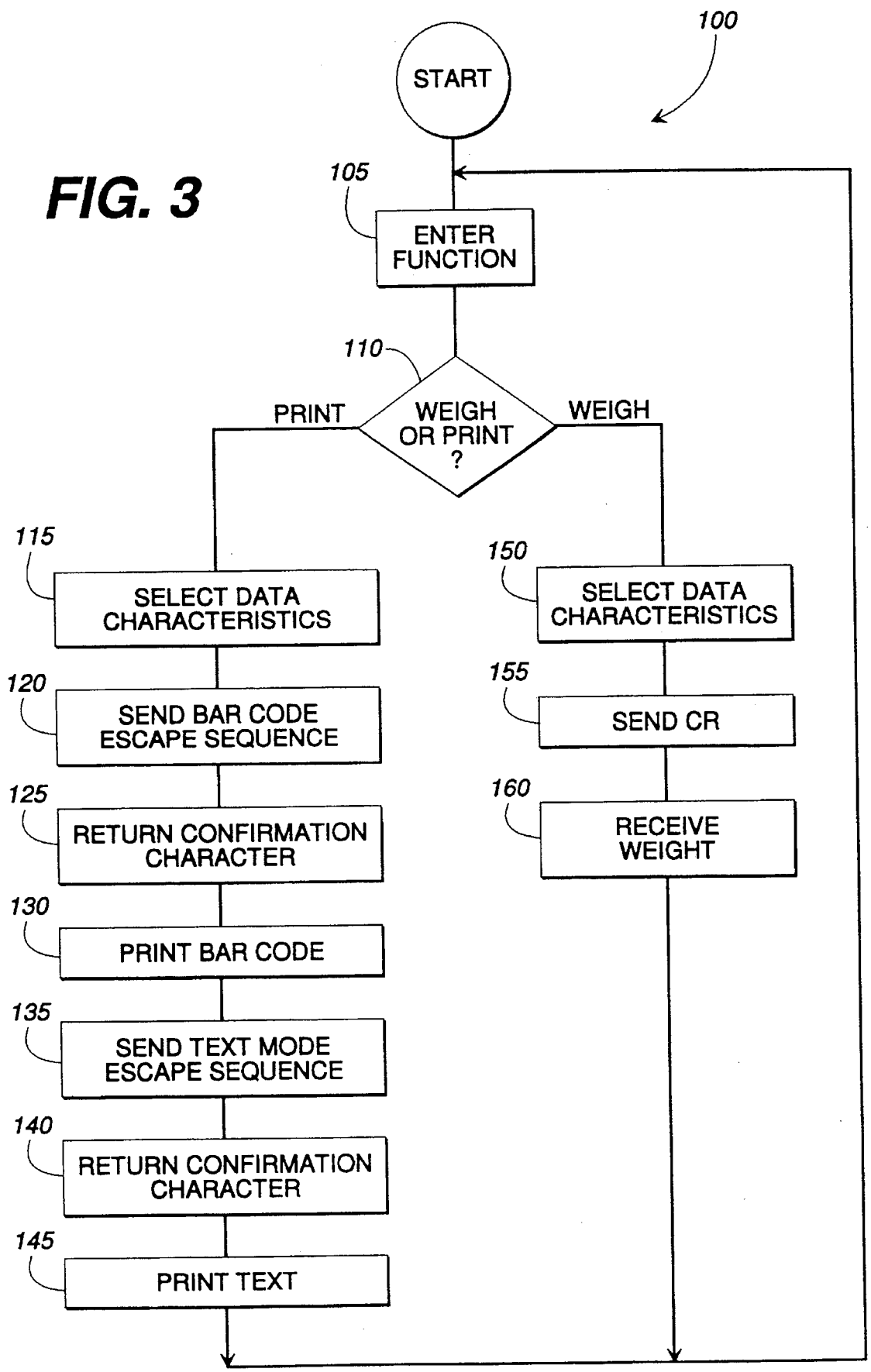
FIG. 3 is a flow chart illustrating the process by which the data communications cable may be used to facilitate data communications between a data terminal and two peripheral devices.

FIG. 3 is a flow chart illustrating the process by which the Y splitter cable may be used to facilitate data communications between a data terminal and two peripheral devices. In addition to the hardware features described above, the invention includes a software element that controls the transmission of data from the data terminal 15 to the scale 20 and printer 25. The data terminal 15 may be programmed to operate with the printer 20, and scale 25 by employing software development and data communications techniques that will be familiar to those skilled in the art. Although most of the method will be controlled by or implemented in software that runs on the microprocessor in the data terminal 15, the flow chart of FIG. 3 also illustrates pertinent functions that are carried out by the printer 20, the scale 25, and by the user.

In summary, the scale 25 transmits and receives data at 2400 bits per second (bps), and transmits data only in response to a "carriage return" character from the data terminal 15. The printer 20 transmits and receives data at 9600 bps. Therefore, the data terminal is able to communicate with the printer 20 or scale 25 by selecting the proper baud rate, and sending the proper command characters. As described above, the cable 10 is constructed to facilitate communication between the data terminal and the selected peripheral device, and to prevent interference by, or damage to, the unselected peripheral device.

The preferred method 100 begins at step 105, where the operator or user indicates whether the desired function is weighing a package or printing a shipping label. It will be understood that the data terminal is operative for performing other functions related to the collection and management of shipping data. However, the printing and weighing functions are the only functions that necessitate data communications over the cable 10 in the exemplary system of FIG. 1. At step 110, the data terminal 10 determines whether the desired function involves weighing a package or printing a label. If the desired function is printing, the method proceeds to step 115. If the desired function is weighing, the method proceeds to step 150.

At step 115, the data terminal 15 begins the printing algorithm by selecting the appropriate data characteristics for data communications with the printer 20. In the case of the preferred printer 20, the data configuration is 9600 bits per second (bps), seven bits, even parity, and one stop bit. It will be understood that the data terminal may be easily configured to communicate using data formats required by other peripheral devices.

Those skilled in the art will understand that various aspects of the printer's functionality are determined by escape sequences sent to the printer by the data terminal. By sending the appropriate sequence, the data terminal is able to control whether the printer prints in text or bar code mode. Escape sequences are also used to determine the size of the label or page that is being printed.

At step 120, the data terminal 15 initiates communications with the printer 20 by sending an escape sequence that places the printer in the bar code mode. At step 125, the printer will return a confirmation character in order to indicate to the data terminal that the printer is ready to receive and print bar code data. At step 130, the data terminal 15 transmits the data associated with the bar code and the bar code portion of the label is printed.

After the bar code data has been transmitted to the printer 20, the method proceeds to step 135, where the data terminal 15 sends another escape sequence that places the printer in the text mode. At step 140, the printer will return a confirmation character in order to indicate to the data terminal that the printer is ready to print text data. At step 145, the data terminal 15 transmits the data associated with the text and that portion of the label is printed. From step 145, the method returns to step 105 and waits for another function to be selected by the user. Those skilled in the art will understand that in addition to the confirmation characters mentioned above, the printer may also provide other status and error information to the data terminal 15 via the RxD line.

At step 150, the data terminal 15 begins the weighing algorithm by selecting the appropriate data characteristics for data communications with the scale 25. In the case of the preferred scale 25, the data configuration is 2400 bits per second (bps), seven bits, even parity, and 1 stop bit.

At step 155, the data terminal 15 initiates communications with the printer 20 by sending a CARRIAGE RETURN character (0d hex) to the scale. This control character instructs the scale 25 to weigh the object on the scale. At step 160, the scale sends to the data terminal 15 data that indicates the weight of the object. This weight data is then interpreted by the data terminal 15. In addition to being made part of the data record pertaining to that package, the data terminal may be used along with destination data to determine the shipping fee. From step 160, the method returns to step 105 and waits for another function to be selected by the user.

Those skilled in the art will appreciate that the system described above functions properly because the printer 20 and scale 25 communicate via data having different characteristics, and because the cable protects each peripheral device from signals transmitted by the other peripheral device. By taking advantage of these data characteristics and protecting the peripheral devices, the cable of the present invention allows a data terminal to be simultaneously connected to two peripheral devices.

In the preferred system, the data characteristics vary in terms of the baud rate. When the data terminal 15 sends data to the printer 20 at 9600 bps, this data is unintelligible to the scale 25, which communicates at 2400 bps. Because the 9600 bps data is unintelligible to the scale, the scale remains in its idle state during the printing process. Likewise, 2400 bps data from the data terminal to the scale is ignored by the printer, which remains in the idle state during the weighing process.

Although the system is described in conjunction with data having different baud rates, those skilled in the art will appreciate that the principles of the present invention may also be applied where the two peripheral devices respond to unique control characters. In such a case, the printer and scale would each respond to unique control characters, and those unique characters would not be sent by the data terminal except when it intended to communicate with the appropriate peripheral device. As in the preferred system, the cable would include circuitry to protect each peripheral device from damage resulting from data transmitted by the other peripheral device.

Likewise, those skilled in the art will understand that the principles of the present invention may be employed to provide a cable for simultaneously connecting a data terminal to three or more peripheral devices. This may be accomplished by providing similar connections between the data terminal and the additional peripheral devices. This would include connecting the transmit data line to the additional peripheral devices. It would also be necessary to connect another receive data line segment and a current blocking device to each of the additional peripheral devices.

From the foregoing description, it will be understood that present invention provides method and apparatus for simultaneously connecting a data terminal to multiple peripheral devices. The cable of the present invention may be constructed inexpensively, and does not require manual intervention or an external power supply.

The present invention has been described in relation to particular embodiments which are intended in all respects to be illustrative rather than restrictive. Alternative embodiments will become apparent to those skilled in the art to which the present invention pertains without departing from its spirit and scope. Accordingly, the scope of the present invention is defined by the appended claims rather than the foregoing description.

What is claimed is:

1. A method for simultaneously connecting a data terminal to first and second peripheral devices, and for communicating with one of said first and second peripheral devices while the other of said first and second peripheral devices remains connected, comprising the steps of:

providing a transmit data line between a first transmit data conductor on said first peripheral device, a second transmit data conductor on said second peripheral device, and a third transmit data conductor on said data terminal;

providing a receive data line between a first receive data conductor on said first peripheral device, a second receive data conductor on said second peripheral device, and a third receive data conductor on said data terminal;

transmitting on said transmit data line transmit data signals from said data terminal to said first and second peripheral devices, said transmit data signals comprising a first characteristic or a second characteristic, said first characteristic comprising a first data rate and said second characteristic comprising a second data rate, said first data rate being different than said second data rate;

in response to said transmit data signals comprising said first characteristic, transmitting on said receive data line first receive data signals from said first peripheral device to said data terminal, and blocking said first receive data signals from said second receive data conductor on said second peripheral device; and in response to said transmit data signals comprising said second characteristic, transmitting on said receive data line second receive data signals from said second peripheral device to said data terminal, and blocking said second receive data signals from said first receive data conductor on said first peripheral device.

2. A method as recited in claim 1, wherein said first characteristic comprises a first data character and said second characteristic comprises a second data character.

3. A method as recited in claim 1, wherein said receive data line comprises a diode connected to said first receive data conductor, and wherein said step of blocking said second receive data signals from said first receive data conductor comprises blocking electrical current.

4. A method as recited in claim 3, wherein the anode of said diode is connected to said first receive data conductor, and said cathode is connected to said third receive data conductor.

5. A method as recited in claim 3, wherein the cathode of said diode is connected to said first receive data conductor, and said anode is connected to said third receive data conductor.

6. A method as recited in claim 1, wherein said receive data line comprises a diode connected to said second receive data conductor, and wherein said step of blocking said first receive data signals from said second receive data conductor comprises blocking electrical current.

7. A method as recited in claim 6, wherein the anode of said diode is connected to said second receive data conductor, and said cathode is connected to said third receive data conductor.

8. A method as recited in claim 6, wherein said cathode of said diode is connected to said second receive data conductor, and said anode is connected to said third receive data conductor.

9. A system for processing data, comprising:

a data terminal;

a first peripheral device connected to said data terminal and responsive to data having a first characteristic, said first characteristic comprising a first data rate;

a second peripheral device connected to said data terminal and responsive to data having a second characteristic, said second characteristic comprising a second data rate said second data rate being different than said first data rate; and a cable for simultaneously connecting said data terminal to said first peripheral device and to said second peripheral device, said cable comprising a transmit data conductor for simultaneously conveying transmit data from said data terminal to said first peripheral device and to said second peripheral device, a first receive data conductor for receiving first peripheral device data from said first peripheral device, a second receive data conductor for receiving second peripheral device data from said second peripheral device, a third receive data conductor connected to said first and second receive data conductors for providing said first peripheral device data and said second peripheral device data to said data terminal, a first blocking device connected to said first receive data conductor for blocking current from said second peripheral device and a second blocking device connected to said second receive data conductor for blocking current from said first peripheral device;

said data terminal being operative to:
   receive input data;
   in response to said input data, determine whether to communicate with said first peripheral device or with said second peripheral device;
   in response to a determination to communicate with said first peripheral device, transmitting transmit data having said first characteristic; and
   in response to a determination to communicate with said second peripheral device, transmitting transmit data having said second characteristic.

10. A system for processing data as recited in claim 9, wherein said first characteristic comprises a first data character and said second characteristic comprises a second data character.

11. A system for processing data as recited in claim 9, wherein said first blocking device comprises a first diode, and said second blocking device comprises a second diode.

12. A system for processing data associated with an item, comprising:

a scale for weighing said item, said scale being responsive to signals having a first data characteristic;

a printer for printing a label for said item, said printer being responsive to signals having a second data characteristic;

a data terminal for processing said data associated with said item; and a cable for simultaneously connecting said data terminal to said scale and to said printer, said cable comprising a transmit data conductor for simultaneously conveying transmit data from said data terminal to said scale and to said printer, a first receive data conductor for receiving scale data from said scale, a second receive data conductor for receiving printer data from said printer, a third receive data conductor connected to said first and second receive data conductors for providing said scale data and said printer data to said data terminal, a first blocking device connected to said first receive data conductor for blocking current from said printer, and a second blocking device connected to said second receive data conductor for blocking current from said scale;

said data terminal being operative to:
  receive input data from a user;
  in response to said input data, determine whether to communicate with said scale or with said printer;
  in response to a determination to communicate with said scale, request said scale data from said scale by transmitting transmit data having said first data characteristic; and
  in response to a determination to communicate with said printer, provide data to said printer by transmitting transmit data having said second data characteristic.

13. A system for processing data as recited in claim 12, wherein said first data characteristic comprises a first data rate and said second data characteristic comprises a second data rate.

14. A system for processing data as recited in claim 12, wherein said first data characteristic comprises a first data character and said second data characteristic comprises a second data character.

15. A system for processing data as recited in claim 12, wherein said first blocking device comprises a first diode, and said second blocking device comprises a second diode.

16. A system for processing data as recited in claim 12, wherein said scale data and said printer data comprise:
  a first voltage corresponding to an idle state, said first voltage being maintained when said first peripheral device is not sending data; and
  a second voltage corresponding to an active state;
  said second voltage being greater than said first voltage.

* * * * *